US011598702B2

(12) United States Patent
Chen et al.

(10) Patent No.: US 11,598,702 B2
(45) Date of Patent: Mar. 7, 2023

(54) DOUBLE-CROSS COMPOSITE FABRIC MEMBRANE BIAXIAL TENSILE STRENGTH TEST PIECE AND MANUFACTURING METHOD THEREOF

(71) Applicant: SHANGHAI JIAO TONG UNIVERSITY, Shanghai (CN)

(72) Inventors: Wujun Chen, Shanghai (CN); Chengjun Gao, Shanghai (CN); Taibai Shi, Shanghai (CN); Pingan Wang, Hefei (CN); Mei Wang, Hefei (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 641 days.

(21) Appl. No.: 16/617,062

(22) PCT Filed: May 23, 2018

(86) PCT No.: PCT/CN2018/087984
§ 371 (c)(1),
(2) Date: Nov. 26, 2019

(87) PCT Pub. No.: WO2018/214902
PCT Pub. Date: Nov. 29, 2018

(65) Prior Publication Data
US 2020/0116606 A1    Apr. 16, 2020

(30) Foreign Application Priority Data
May 26, 2017 (CN) .......................... 201710386428.8

(51) Int. Cl.
*G01N 3/00* (2006.01)
*G01N 3/08* (2006.01)
(Continued)

(52) U.S. Cl.
CPC ............... *G01N 3/08* (2013.01); *G01N 1/286* (2013.01); *G01N 3/04* (2013.01); *G01N 2001/2873* (2013.01); *G01N 2203/0254* (2013.01)

(58) Field of Classification Search
CPC ... G01N 3/08; G01N 1/286; G01N 3/04; G01N 2001/2873; G01N 2203/0254
See application file for complete search history.

(56) References Cited

U.S. PATENT DOCUMENTS 5,144,844 A * 9/1992 Mathiak ................ G01N 3/04
73/794
5,448,918 A * 9/1995 Tucchio ................ G01N 3/04
73/818
(Continued)

FOREIGN PATENT DOCUMENTS

| CN | 104236974 A | 12/2014 |
| CN | 204202955 U | 3/2015 |

(Continued)

OTHER PUBLICATIONS

Chen, Wujun et al.; "Biaxial Shear Test and Mechanical Property Analysis of P/G-Type Architectural Fabrics"; Journal of Building Materials; vol. 19, No. 3; Jun. 2016; pp. 539-543.
(Continued)

*Primary Examiner* — Max H Noori
(74) *Attorney, Agent, or Firm* — Fitch, Even, Tabin & Flannery LLP (57) ABSTRACT

A double-cross composite fabric membrane biaxial tensile strength test piece is provided, including a core region and four cantilevers. The four cantilevers extend outwards around the core region and form a cross shape. Each cantilever is connected to the core region via an edge transition region. An end portion of the cantilever is a clamping section. The clamping section is provided with a
(Continued)

clamping end rubber rod. The clamping end rubber rod is used for connecting to a clamp of a biaxial tensile testing machine. The clamping section is three-layered. The cantilever and the edge transition region are double-layered. The core region is single-layered. The edge transition region is in the shape of a quadrangle rounded at four corners. A manufacturing method of the test piece is also provided.

9 Claims, 4 Drawing Sheets

(51) Int. Cl.
   *G01N 1/28* (2006.01)
   *G01N 3/04* (2006.01)

(56) References Cited

U.S. PATENT DOCUMENTS

| | | | |
|---|---|---|---|
| 7,204,160 B1* | 4/2007 | Sadegh | G01N 3/10 73/862.041 |
| 2009/0282929 A1* | 11/2009 | Abu-Farha | G01N 3/04 73/860 |
| 2011/0138925 A1* | 6/2011 | Pirker | G01N 3/165 73/788 |
| 2011/0174056 A1* | 7/2011 | Liggett | G01N 33/367 73/788 |
| 2019/0072467 A1* | 3/2019 | Iwamoto | G01N 3/08 |
| 2022/0212862 A1* | 7/2022 | Yang | B32B 1/00 |

FOREIGN PATENT DOCUMENTS

| | | |
|---|---|---|
| CN | 104568591 A | 4/2015 |
| CN | 105158074 A | 12/2015 |
| CN | 205246451 U | 5/2016 |
| CN | 107340184 A | 11/2017 |
| JP | 2013217732 A | 10/2013 |

OTHER PUBLICATIONS

Ren, Jia-Tao et al.; "Biaxial Tension Test and the Strengthening of Titanium Sheets under Biaxial Tension"; Journal of Experimental Mechanics; vol. 16, No. 2; Jun. 2001; pp. 196-206.

Beccarelli, Paolo; "Biaxial Testing for Fabrics and Foils: Optimizing Devices and Procedures"; Springer; 2015; pp. 1-146.

Chen, Jianwen et al.; "Central Crack Tearing Testing of Laminated Fabric Uretek3216LV under Uniaxial and Biaxial Static Tensile Loads"; Journal of Materials in Civil Engineering; vol. 28, No. 7; 2016; pp. 1-14.

Lu, Shuai; "Design Analysis and Experimental Research of an In-situ Biaxial Tensile Device for Characterizing Mechanics of Materials"; Master's Thesis from Jilin University China; 2015; pp. 1-86.

Stranghöner, Natalie et al.; "Prospect for European Guidance for the Structural Design of Tensile Membrane Structures"; JRC Science and Policy Report; European Commission; 2016; pp. 1-278.

Li, Yang; "Study and Applications on Mechanical Properties of Membrane Materials and Structures"; Ph.D. Thesis from Tongji University; Aug. 2007; pp. 1-152.

Tian, Lan et al.; "Technical Specification for Membrane Structures"; China Engineering Construction Standardization Association; May 30, 2004; pp. 1-75.

Shaeffer, Ron et al.; "Tensile Membrane Structures"; American Society of Civil Engineers; 2016; pp. 1-63.

PCT; App No. PCT/CN2018/087984; International Search Report and Written Opinion dated Sep. 3, 2018.

CNIPO; App. No. 201710386428.8; Decision of Rejection dated Jan. 17, 2020.

* cited by examiner

DOUBLE-CROSS COMPOSITE FABRIC MEMBRANE BIAXIAL TENSILE STRENGTH TEST PIECE AND MANUFACTURING METHOD THEREOF

CROSS-REFERENCE TO RELATED APPLICATIONS

This application is a U.S. national phase application of International Application No. PCT/CN2018/087984, filed May 23, 2018, designating the United States, which claims priority to Chinese Patent Application No. 201710386428.8, filed May 26, 2017.

FIELD OF THE INVENTION

The invention relates to a test piece for testing the biaxial tensile strength of a flexible fabric membrane material, and in particular, to a double-cross composite fabric membrane biaxial tensile strength test piece and a manufacturing method thereof. The test piece may be used for testing the biaxial tensile strength of a flexible membrane such as an architectural coated fabric membrane and a high-performance multi-functional laminated skin of an airship. The invention belongs to the fields of experimental technology for mechanics of materials and material testing technology for architectural structures.

DESCRIPTION OF THE PRIOR ART

Flexible fabric film materials are usually formed from a force-bearing layer fabric base, a functional coating, etc., are widely applied to the industrial fields such as architecture and aerospace, and are basically subjected to stress in a bidirectionally tensioned state. Biaxial tensile test methods have already been widely used in researches on mechanical properties of fabric membranes under two-dimensional stresses during normal use. However, currently, only uniaxial tensile test and design methods are still used for the strength and failure of fabric membranes. The fabric structure of the fabric membrane has orthotropic and nonlinear characteristics, and the uniaxial tensile strength cannot accurately characterize the strength of the biaxial tensile stress thereof. Therefore, at present, there is still no effective method for testing the biaxial tensile strength of the fabric membrane at home and abroad.

Wide researches have been made on biaxial testing of the fabric membrane. Both biaxial tensile testing machines and biaxial tensile test methods have been greatly improved. However, current researches still focus on mechanical properties in low-load biaxial tension, and there is still no biaxial tensile strength test method. For example:

"Technical Specification for Membrane Structures" (CECS158-2015) specifies the use of a biaxial tensile test method to test elastic constants of architectural P/G membranes.

"Tensile Membrane Structures" (ASCE/SEI 55-16) specifies the use of biaxial tension to test a tensile elastic constant of a coated fabric membrane and a strain compensation method.

"Prospect for European Guides for the Structural Design of Tensile Membrane Structures" (Publications Office of the European Union, 2016.1) by Natalie, Jorg et al. introduces a biaxial tensile test method and a biaxial shear test method for architectural fabric membranes.

"Biaxial Testing for Fabrics and Foils" (Springer, 2015) by Paolo et al. introduces the use of planar biaxial tension, the inflation of a circular tube, and bubble test methods to test mechanical properties of fabric membranes and films.

"Central Crack Tearing Testing of Laminated Fabric Uretek3216LV Under Uniaxial and Biaxial Static Tensile Loads" (Journal of Materials in Civil Engineering, 2016, 8(4), (ASCE)MT.1943-5533.0001537) by CHEN Jianwen and CHEN Wujun introduces a biaxial tearing test method.

"Research and Application of Mechanical Properties of Architectural Membrane Materials and Membrane Structures" (Ph.D. Thesis from Tongji University, 08.2007) by LI Yang has researched a biaxial tensile testing machine and customized a loading spectrum and a test method.

"Biaxial Shear Test and Mechanical Characteristic Analysis of Architectural P/G Fabric Membranes" (Journal of Building materials, 2016, 03:539-543) by CHEN Wujun, WANG Ligang, and GAO Chengjun has researched a biaxial shear test method for fabric membranes and the shear mechanical properties of the membranes.

At present, most of biaxial tensile strength tests are applied to metal material tests, and important progresses and results have been achieved.

"Progress in Bidirectional Tensile Test and Research on Reinforcement of Titanium Plate Under Bidirectional Tension" (Journal of Experimental Mechanics, 2001, 02:196-206.) by REN Jiatao, LI Gangling, and DOU Zhiwu has performed biaxial tensile tests on metal materials and researched mechanical properties of a titanium plate under bidirectional tension.

"Design Analysis and Experimental Research of an In-situ Biaxial Tensile Device for Characterizing Mechanics of Materials" (Master's Thesis from Jilin University, 2015) by LU Shuai has researched a biaxial tensile mechanical test apparatus and tested the mechanical properties of a plurality of metal materials under bidirectional stresses.

Currently, for flexible fabric membrane biaxial tensile double-cross test pieces, which are used for researching mechanical behavior during normal use, when the stress level is relatively high, due to the stress concentration effect at slits, edge chamfers, etc., damage occurs in a stress concentration region of the test piece if the biaxial tensile stress is much lower than the uniaxial tensile strength, the stress value thereof cannot characterize the biaxial tensile strength of the fabric membrane, and the form of damage thereof cannot reflect the actual mechanism of mechanical behavior under biaxial tension. Currently, none of these technologies can satisfy the technological requirements of biaxial tensile strength testing of fabric membranes.

SUMMARY OF THE INVENTION

In view of the foregoing defects in the prior art, the technical problem to be solved by the invention is to provide a double-cross composite fabric membrane biaxial tensile strength test piece for a flexible fabric membrane and a manufacturing method thereof, which can be used in combination with a biaxial tensile testing machine to test the biaxial tensile strength of a flexible coated fabric membrane, and the biaxial tensile strength of another polymer flexible film.

To achieve the foregoing objective, a first aspect of the invention provides a double-cross composite fabric membrane biaxial tensile strength test piece, comprising a core region and four cantilevers, wherein the four cantilevers extend outwards around the core region and form a cross shape, each cantilever is connected to the core region via an edge transition region, and an end portion of the cantilever is a clamping section provided with a clamping end rubber rod, which is used for connecting to a clamp of a biaxial tensile testing machine; the double-cross composite fabric membrane biaxial tensile strength test piece is configured such that during a biaxial tensile strength test, the cantilever transfers a tensile force from the biaxial testing machine to the transition region, the tensile force is eventually applied to the core region, which is a biaxial tensile test core region, and tensile damage first occurs in the core region; and wherein the clamping section is three-layered, the cantilever and the edge transition region are double-layered, the core region is single-layered, and the edge transition region is in the shape of a quadrangle rounded at four corners.

Further, the cantilever comprises a first layer and a second layer, the length of the second layer is greater than that of the first layer, the second layer is folded upward to overlap an end portion of the first layer, so that the clamping section has three layers, and the clamping end rubber rod is wrapped in the three layers of the clamping section.

Further, the first layer and the second layer are welded or adhesively bonded together.

Further, the cantilever is provided with a plurality of slits, which are parallel to the length direction of the cantilever.

Further, the material of the double-cross composite fabric membrane biaxial tensile strength test piece is a fabric membrane, and the length direction of the cantilever is parallel to the warp or weft direction of the fabric membrane.

Further, a rounded corner is formed between two adjacent cantilevers, and a region in which the rounded corner is located between the two adjacent cantilevers is double-layered.

A second aspect of the invention provides a manufacturing method of the foregoing double-cross composite fabric membrane biaxial tensile strength test piece, comprising the following steps:

step 1: choosing a non-defective region on a fabric membrane that is at least 10 cm away from a width edge and a roll end edge, to cut a first cut sheet and a second cut sheet having an orthogonal cross shape, wherein each of the first cut sheet and the second cut sheet comprises four arms, the four arms of each cut sheet form the orthogonal cross shape, the arms of the first cut sheet are longer than the arms of the second cut sheet, and a square hole rounded at four corners is provided at the center of the second cut sheet; each arm is furthermore parallel to the warp or weft direction of the fabric membrane of the cut sheet in which the arm is located; and during cutting, a rounded corner is formed between two adjacent arms in each cut sheet;

step 2: placing the second cut sheet on the first cut sheet, aligning the center and the four arms of the second cut sheet with the center and the four arms of the first cut sheet respectively, uniformly applying mutually soluble adhesives to an overlap surface of the first cut sheet and an overlap surface of the second cut sheet, then overlapping and adhesively bonding the first cut sheet and the second cut sheet, uniformly compressing the first cut sheet and the second cut sheet, and then placing the first cut sheet and the second cut sheet in a dry environment until the mutually soluble adhesives are cured, so that the first cut sheet and the second cut sheet are completely adhesively bonded together to obtain four cantilevers, wherein the overlap surfaces are weldable surfaces or glueable surfaces;

step 3: making a part of the arm of the first cut sheet that is beyond the arm of the second cut sheet and located at an end portion of the cantilever wrap a clamping end rubber rod, then applying mutually soluble adhesives, and then performing folding, overlapping, and gluing to obtain a clamping section of the cantilever; and step 4: manufacturing a plurality of slits in each cantilever, with the slits being parallel to the length direction of the cantilever.

Further, in step 2, after the second cut sheet is placed on the first cut sheet, a core region is formed at a central region of the first cut sheet, and the core region is used as a core test region of the test piece and is single-layered; an edge transition region is formed around the core region and is double-layered; the square hole at the center of the second cut sheet provides a quadrangle rounded at four corners at a connection between the edge transition region and the core region; and the cantilever is also double-layered.

Further, two ends of the slit are respectively approximately 2 cm away from the clamping section and the connection between the edge transition region and the cantilever.

Further, in step 3, after the part of the arm of the first cut sheet that is beyond the arm of the second cut sheet and located at the end portion of the cantilever is folded, the clamping section is three-layered.

A method for testing the biaxial tensile strength by using the foregoing double-cross composite fabric membrane biaxial tensile strength test piece of the invention is as follows: laying the double-cross composite fabric membrane biaxial tensile strength test piece on a test bench of a biaxial tensile testing machine, wherein clamping sections of four cantilevers are orthogonally and symmetrically connected to clamps of the testing machine; turning on the biaxial tensile testing machine, and adjusting the testing machine to pre-stress the test piece; and setting a biaxial tensile loading mode, and performing gradual loading to perform a biaxial tensile strength test. When damage to the double-cross composite fabric membrane biaxial tensile strength test piece first occurs in a core region, the damage to the test piece is effective damage. In this case, a tensile force measured by the testing machine can characterize the biaxial tensile strength of a fabric membrane.

By means of the double-cross composite fabric membrane biaxial tensile strength test piece of the invention, the biaxial tensile strength of the fabric membrane can be measured and characterized, damage occurs in the single-layered test region, and the cantilever and the edge transition region are damaged later due to being strengthened. The test piece may be applied to architectural membranes, airship skins, and other industrial fabric fields.

The concept, specific structure and resulting technical effect of the invention are further described below in conjunction with the drawings to fully understand the object, features and effects of the invention.

DETAILED DESCRIPTION OF THE PREFERRED EMBODIMENTS

Figure 1:
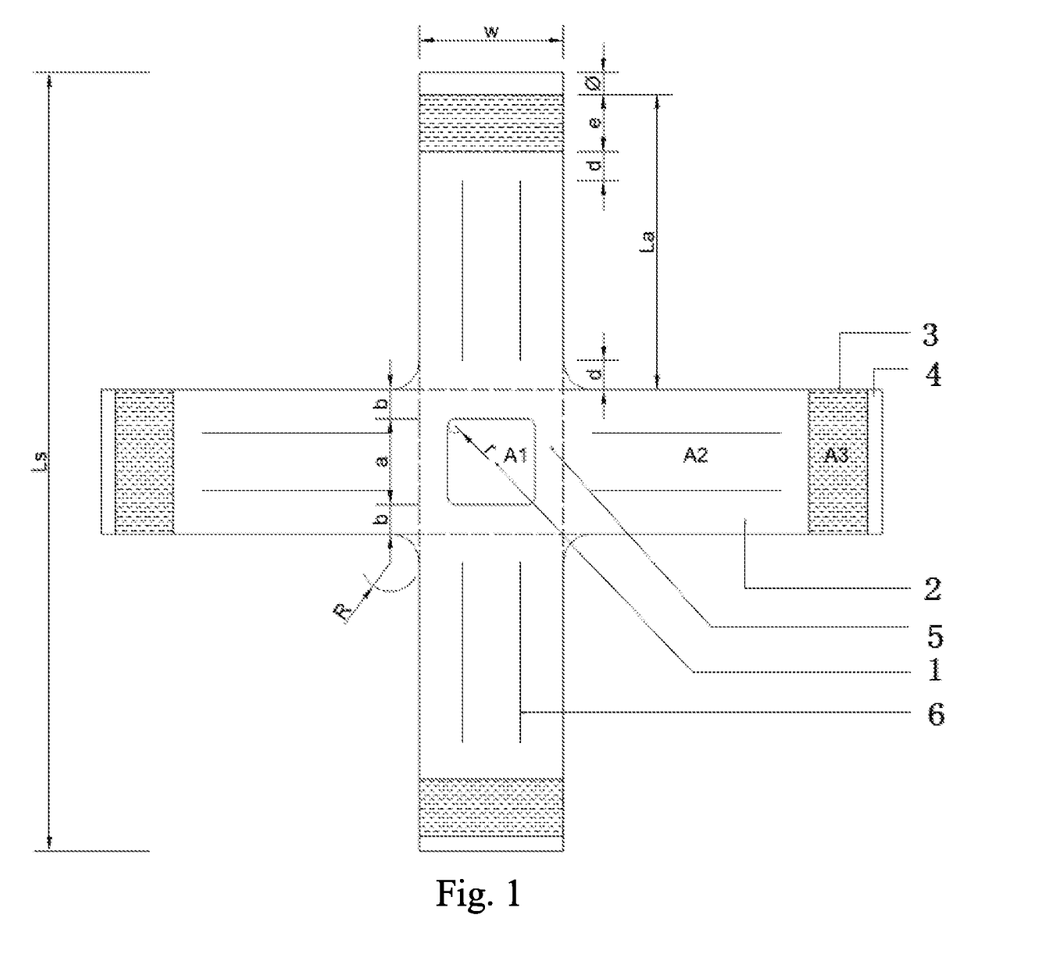
FIG. 1 is a top view of a double-cross composite fabric membrane biaxial tensile strength test piece according to a preferred embodiment of the invention.
Figure 2:
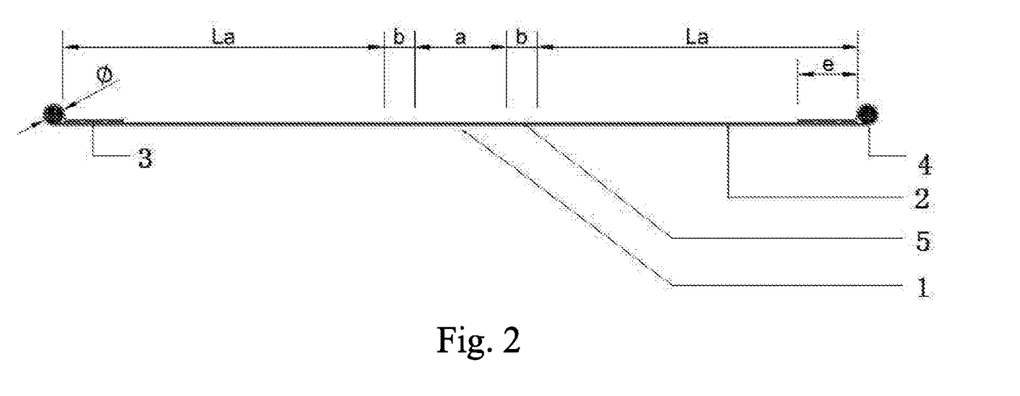
FIG. 2 is a sectional view of a double-cross composite fabric membrane biaxial tensile strength test piece according to a preferred embodiment of the invention.
Figure 3:
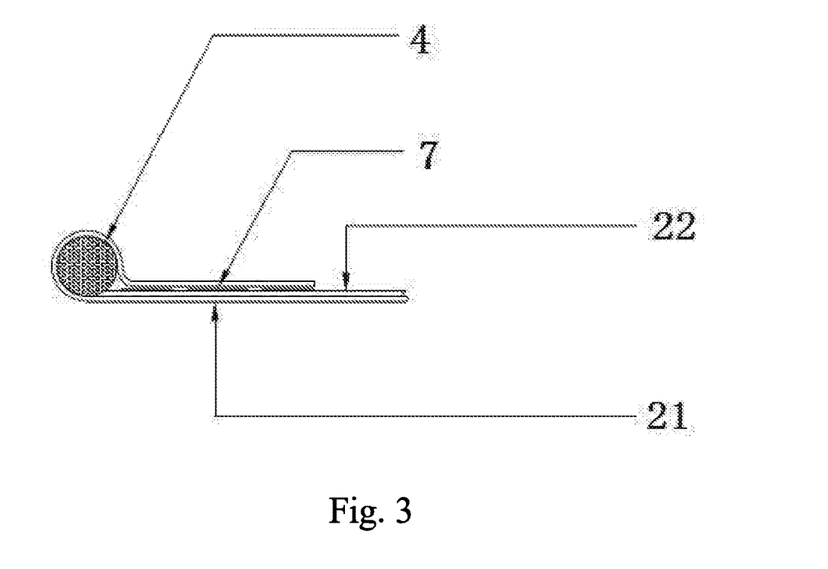
FIG. 3 is a partial sectional view of a clamping end rubber rod of a double-cross composite fabric membrane biaxial tensile strength test piece according to a preferred embodiment of the invention.

As shown in FIGS. 1-3, a preferred embodiment of the invention provides a double-cross composite fabric membrane biaxial tensile strength test piece, comprising a core region 1 and four cantilevers 2. The four cantilevers 2 extend outwards around the core region 1 and form a cross shape. Each cantilever 2 is connected to the core region 1 via an edge transition region 5. An end portion of the cantilever 2 is a clamping section 3. The clamping section 3 is provided with a clamping end rubber rod 4. The clamping end rubber rod 4 is used for connecting to a clamp of a biaxial tensile testing machine. The clamping section 3 is three-layered. The cantilever 2 and the edge transition region 5 are double-layered. The core region 1 is single-layered. The edge transition region 5 is in the shape of a quadrangle rounded at four corners.

The double-cross composite fabric membrane biaxial tensile strength test piece in this embodiment is configured such that during a biaxial tensile strength test, the cantilever 2 transfers a tensile force from the biaxial testing machine to the transition region, the tensile force is eventually applied to the core region 1, which core region 1 is a biaxial tensile test core region, and tensile damage first occurs in the core region 1.

The material of the double-cross composite fabric membrane biaxial tensile strength test piece is a fabric membrane. The length direction of the cantilever 2 is parallel to the warp or weft direction of the fabric membrane. Each cantilever 2 comprises a first layer and a second layer. The length of the second layer is greater than that of the first layer. The second layer is folded upward to overlap an end portion of the first layer, so that the clamping section 3 has three layers. The clamping end rubber rod 4 is wrapped in the three layers of the clamping section 3 (see FIGS. 2 and 3). The first layer and the second layer are welded or adhesively bonded together. The cantilever 2 is provided with a plurality of slits 6, preferably, two to four slits 6. The slits 6 are parallel to the length direction of the cantilever 2.

As shown in FIGS. 1 and 2, the test piece is orthogonally symmetrical and comprises the four cantilevers 2, the four clamping end rubber rods 4, the core region 1, and the edge transition region 5. Each cantilever 2 is double-layered and is formed by gluing two cross cut sheets (a first cut sheet 21 and a second cut sheet 22). The clamping section 3 of the cantilever 2 is three-layered. A clamping end rubber rod with a diameter $\Phi$ is wrapped at the end of the cantilever 2. The cantilever 2 has a length La and a width w. The core region 1 is single-layered, is a core test region, and is in the shape of a square with the side length of a, where $a=w-2b$. The width of the clamping section 3 is e, and the width of the edge transition region 5 is b. The length of the test piece is $Ls=2(La+\Phi)+w$. A rounded corner R is formed between two adjacent cantilevers 2, and a region in which the rounded corner between the two adjacent cantilevers 2 is located is double-layered. In the figures, A3 (the region in which the clamping section 3 is located) is a three-layered glued region, A2 (the region in which the cantilever 2 and the edge transition region 5 are located) is a double-layered glued region, and A1 (the region in which the core region 1 is located) is a single-layered region.

As shown in FIG. 3, the part of the arm in the first cut sheet 21 that is beyond the arm of the second cut sheet 22 is curled upwardly, wraps the clamping end rubber rod with a diameter $\Phi$, and is then glued to the second cut sheet 22.

A manufacturing method of the foregoing double-cross composite fabric membrane biaxial tensile strength test piece in this embodiment comprises the following steps:

Step 1. choosing a non-defective region on a fabric membrane that is at least 10 cm away from a width edge and a roll end edge, to cut a first cut sheet 21 and a second cut sheet 22 having an orthogonal cross shape, wherein each of the first cut sheet 21 and the second cut sheet 22 comprises four arms, the four arms of each cut sheet form the orthogonal cross shape, the arms of the first cut sheet 21 are longer than the arms of the second cut sheet 22, and a square hole rounded at four corners is provided at the center of the second cut sheet 22; each arm is furthermore parallel to the warp or weft direction of the fabric membrane of the cut sheet in which the arm is located; and during cutting, a rounded corner is formed between two adjacent arms in each cut sheet.

Figure 4:
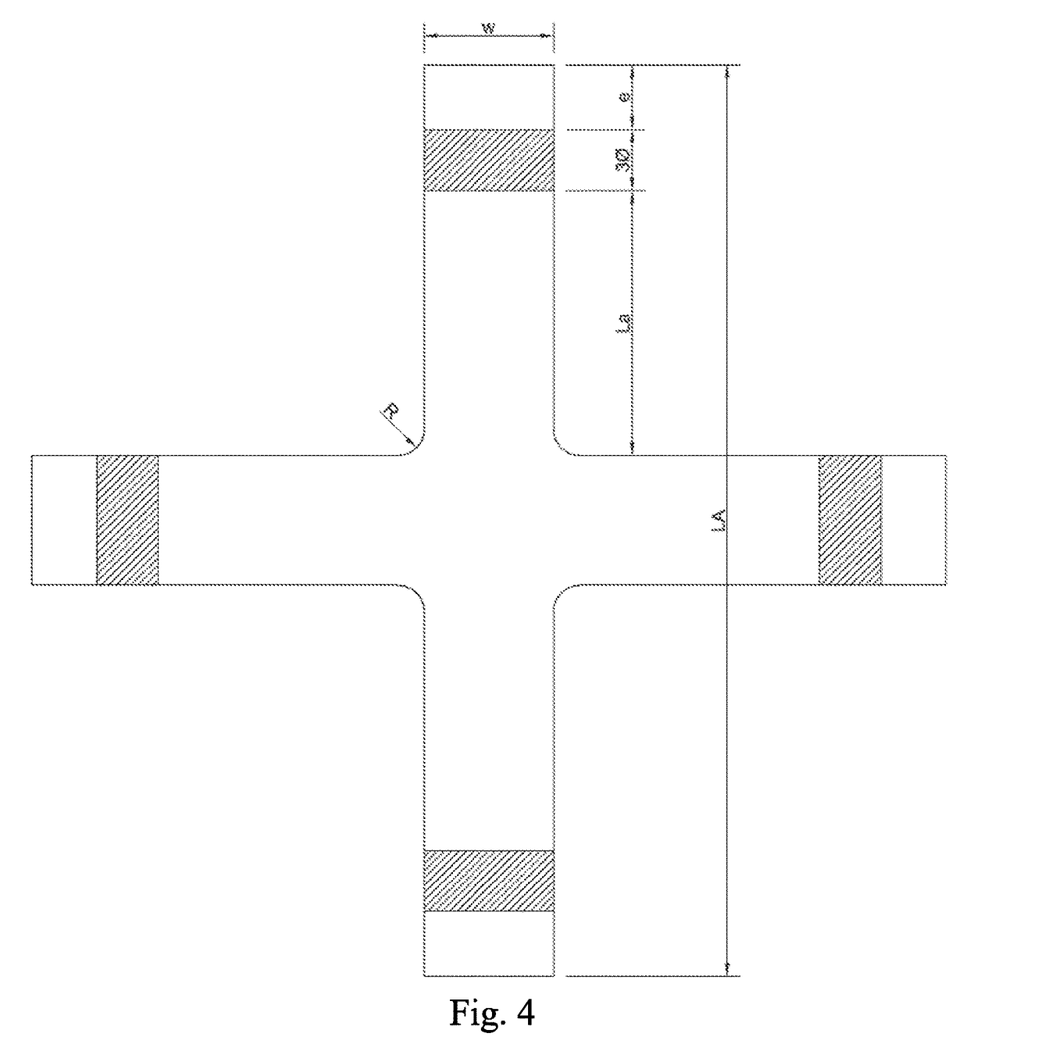
FIG. 4 is a top view of a first cut sheet according to a preferred embodiment of the invention.

As shown in FIG. 4, the first cut sheet 21 is orthogonally symmetrical and has four arms. The arm has a length $LA=2(La+3\Phi+e)+w$, and a width w. An angle between the arms is a rounded corner R. Each arm is parallel to the warp or weft direction of the membrane.

Figure 5:
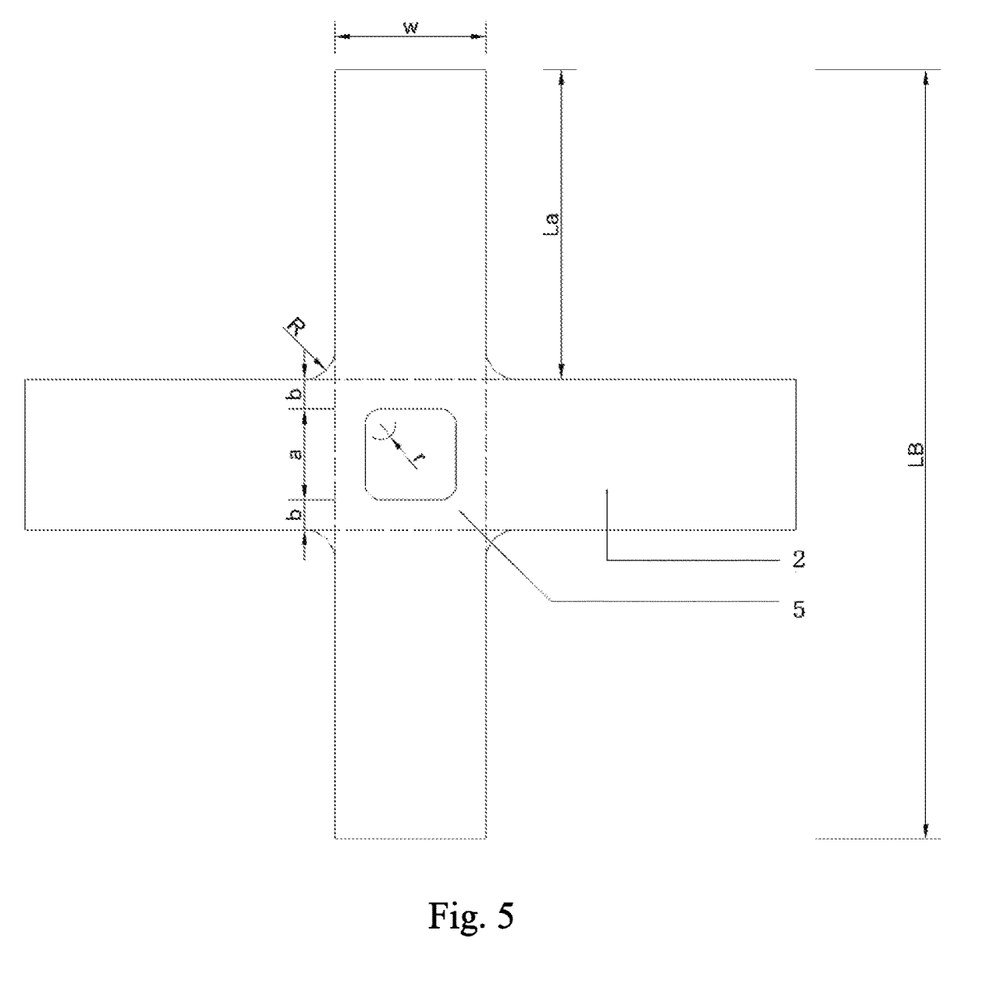
FIG. 5 is a top view of a second cut sheet according to a preferred embodiment of the invention.

As shown in FIG. 5, the second cut sheet 22 is orthogonally symmetrical and has four arms. The arm has a length $LB=2La+w$ and a width w. An angle between the arms is a rounded R. The arms are parallel to the warp or weft direction of the membrane. An edge transition region 5 has a width b, and a quadrangle at the center, i.e. a square hole with the side length being a and four corners being rounded corners r.

Step 2. placing the second cut sheet 22 on the first cut sheet 21, aligning the center and the four arms of the second cut sheet 22 with the center and the four arms of the first cut sheet 21 respectively, uniformly applying mutually soluble adhesives to an overlap surface 7 of the first cut sheet 21 and an overlap surface 7 of the second cut sheet 22, then overlapping and adhesively bonding the first cut sheet and the second cut sheet, uniformly compressing the first cut sheet and the second cut sheet, and then placing the first cut sheet and the second cut sheet in a dry environment until the mutually soluble adhesives are cured, so that the first cut sheet 21 and the second cut sheet 22 are completely adhesively bonded together to obtain four cantilevers 2, wherein the overlap surfaces 7 are weldable surfaces or gluable surfaces.

After the second cut sheet 22 is placed on the first cut sheet 21, a core region 1 is formed at a central region of the first cut sheet 21. The core region 1 is used as a core test region of the test piece and is single-layered. An edge transition region 5 is formed around the core region 1 and is double-layered. The square hole at the center of the second cut sheet 22 provides a quadrangle rounded at four corners at a connection between the edge transition region 5 and the core region 1. The cantilever 2 is also double-layered.

Step 3. making a part of the arm of the first cut sheet 21 that is beyond the arm of the second cut sheet 22 and located at an end portion of the cantilever wrap a clamping end rubber rod 4, then applying mutually soluble adhesives, and then performing folding, overlapping, and gluing to obtain a clamping section 3 of the cantilever 2. After the part of the arm of the first cut sheet 21 that is beyond the arm of the second cut sheet 22 and located at the end portion of the cantilever 2 is folded, the clamping section 3 is three-layered.

Step 4. manufacturing a plurality of (for example, two to four) slits 6 in each cantilever 2, with the slits 6 being parallel to the length direction of the cantilever 2. Two ends of the slit 6 are respectively approximately 2 cm away from the clamping section 3 and the connection between the edge transition region 5 and the cantilever 2.

In this embodiment, the chosen fabric membrane test sample material has no obvious defects such as skews, bows, and blisters, and is away from the width edge of the membrane by not less than 10 cm and away from the roll end of the membrane by not less than 10 cm. The membrane is cut by a manual or automatic cutter.

During specific implementation, the width w and length La of the cantilever 2, the width b of the edge transition region 5, the side length a of the core region 1, the diameter Φ of the clamping end rubber rod 4, the radii R and r of the rounded corners, the number of the slits 6, and the side distance d, the length Ls of the test piece, and the length LA/LB of the cut sheet may be designed as required. In addition, the method in this embodiment can be suitable for other film materials.

In a preferred example, the sizes may be: w=100 mm, b=20 mm, a=60 mm, d=15 mm, La=160 mm, e=40 mm, Φ=12 mm, R=15 mm, and r=10 mm.

The specific preferred embodiments of the invention are described in detail as above. It should be appreciated that a person of ordinary skill in the art would be able to make modifications and variations in accordance with the concept of the invention without involving any inventive effort. Therefore, any technical solution that can be obtained by a person skilled in the art by means of logical analysis, reasoning or limited trials on the basis of the prior art and according to the concept of the invention should be included within the scope of protection of the claims.

The invention claimed is:

1. A double-cross composite fabric membrane biaxial tensile strength test piece, comprising a core region and four cantilevers, wherein the four cantilevers extend outwards around the core region and form a cross shape, each cantilever is connected to the core region via an edge transition region, and an end portion of the cantilever is a clamping section provided with a clamping end rubber rod, which is used for connecting to a clamp of a biaxial tensile testing machine; the double-cross composite fabric membrane biaxial tensile strength test piece is configured such that during a biaxial tensile strength test, the cantilever transfers a tensile force from the biaxial testing machine to the transition region, the tensile force is eventually applied to the core region, which is a biaxial tensile test core region, and tensile damage first occurs in the core region; and wherein the clamping section is three-layered, the cantilever and the edge transition region are double-layered, the core region is single-layered, and the edge transition region is in the shape of a quadrangle rounded at four corners;

wherein the cantilever comprises a first layer and a second layer, the length of the second layer is greater than that of the first layer, the second layer is folded upward to overlap an end portion of the first layer, so that the clamping section has three layers, and the clamping end rubber rod is wrapped in the three layers of the clamping section.

2. The double-cross composite fabric membrane biaxial tensile strength test piece according to claim 1, wherein a rounded corner is formed between two adjacent cantilevers, and a region in which the rounded corner is located between the two adjacent cantilevers is double-layered.

3. The double-cross composite fabric membrane biaxial tensile strength test piece according to claim 1, wherein the first layer and the second layer are welded or adhesively bonded together.

4. The double-cross composite fabric membrane biaxial tensile strength test piece according to claim 1, wherein the cantilever is provided with a plurality of slits, which are parallel to the length direction of the cantilever.

5. The double-cross composite fabric membrane biaxial tensile strength test piece according to claim 1, wherein the material of the double-cross composite fabric membrane biaxial tensile strength test piece is a fabric membrane, and the length direction of the cantilever is parallel to the warp or weft direction of the fabric membrane.

6. A manufacturing method of a double-cross composite fabric membrane biaxial tensile strength test piece comprising the following steps:

step 1: choosing a non-defective region on a fabric membrane that is at least 10 cm away from a width edge and a roll end edge, to cut a first cut sheet and a second cut sheet having an orthogonal cross shape, wherein each of the first cut sheet and the second cut sheet comprises four arms, the four arms of each cut sheet form the orthogonal cross shape, the arms of the first cut sheet are longer than the arms of the second cut sheet, and a square hole rounded at four corners is provided at the center of the second cut sheet; each arm is furthermore parallel to the warp or weft direction of the fabric membrane of the cut sheet in which the arm is located; and during cutting, a rounded corner is formed between two adjacent arms in each cut sheet;

step 2: placing the second cut sheet on the first cut sheet, aligning the center and the four arms of the second cut sheet with the center and the four arms of the first cut sheet respectively, uniformly applying mutually soluble adhesives to an overlap surface of the first cut sheet and an overlap surface of the second cut sheet, then overlapping and adhesively bonding the first cut sheet and the second cut sheet, uniformly compressing the first cut sheet and the second cut sheet, and then placing the first cut sheet and the second cut sheet in a dry environment until the mutually soluble adhesives are cured, so that the first cut sheet and the second cut sheet are completely adhesively bonded together to obtain four cantilevers, wherein the overlap surfaces are weldable surfaces or glueable surfaces;

step 3: making a part of the arm of the first cut sheet that is beyond the arm of the second cut sheet and located at an end portion of the cantilever wrap a clamping end rubber rod, then applying mutually soluble adhesives, and then performing folding, overlapping, and gluing to obtain a clamping section of the cantilever; and step 4: manufacturing a plurality of slits in each cantilever, with the slits being parallel to the length direction of the cantilever.

7. The manufacturing method according to claim 6, wherein in step 2, after the second cut sheet is placed on the first cut sheet, a core region is formed at a central region of the first cut sheet, and the core region is used as a core test region of the test piece and is single-layered; an edge transition region is formed around the core region and is double-layered; the square hole at the center of the second cut sheet provides a quadrangle rounded at four corners at a connection between the edge transition region and the core region; and the cantilever is also double-layered.

8. The manufacturing method according to claim 7, wherein two ends of the slit are respectively approximately 2 cm away from the clamping section and the connection between the edge transition region and the cantilever.

9. The manufacturing method according to claim 6, wherein in step 3, after the part of the arm of the first cut sheet that is beyond the arm of the second cut sheet and located at the end portion of the cantilever is folded, the clamping section is three-layered.

\* \* \* \* \*